United States Patent [19]

Cornec et al.

[11] Patent Number: 5,208,830

[45] Date of Patent: May 4, 1993

[54] PROCESS FOR SEARCHING FOR SYNCHRONIZATION ON RECEPTION OF A SPREAD SPECTRUM MODULATED SIGNAL

[75] Inventors: Jean-Paul Cornec, Lannion; Philippe Gay, Perros-Guirec, both of France

[73] Assignee: French State, represented by the Minister of the Post, Telecommunications and Space, France

[21] Appl. No.: 611,103

[22] Filed: Nov. 9, 1990

[30] Foreign Application Priority Data

Nov. 15, 1989 [FR] France .............................. 89 14968

[51] Int. Cl.⁵ .............................................. H04K 1/00
[52] U.S. Cl. .......................................... 375/1; 380/34
[58] Field of Search ................................ 375/1; 380/34

[56] References Cited

U.S. PATENT DOCUMENTS

| 4,538,281 | 8/1985 | Rajan | 375/1 X |
| 4,653,069 | 3/1987 | Roeder | 375/1 X |
| 4,759,034 | 7/1988 | Nagazumi | 375/1 |
| 4,894,662 | 1/1990 | Counselman | 375/1 X |
| 5,029,181 | 7/1991 | Endo et al. | 375/1 |
| 5,031,191 | 7/1991 | Hiramatsu et al. | 375/1 |

OTHER PUBLICATIONS

Holmes, Jack K., Coherent Spread Spectrum Systems, John Wiley & Sons, New York (1982) pp. 411–419.

Primary Examiner—Tod Swann
Attorney, Agent, or Firm—Laubscher & Laubscher

[57] ABSTRACT

In a phase demodulator is received a signal of which the carrier is phase-modulated by a digital pseudorandom sequence itself phase-modulated by a data signal. A frequency close to that of the carrier is locally modulated by a sequence identical to the received sequence. The received and local signals are mixed into a filtered signal with an intermediary frequency band. A repetitive double integration step of the signal filtered into an integrated signal is used and is compared with a threshold in order to quantify the correlation between the received and local signals. Firstly, the local frequency varies according to a few discrete values spread over the uncertainty range of the carrier corresponding to intermediary frequencies in the vicinity of the filtering band. At each discrete frequency value, integration steps are carried out for half-bit local frequency shifts. Synchronization of the sequences is acquired in response to an integrated signal exceeding said threshold at the end of an integration step. Then, the value of the carrier frequency is estimated by the average of numerous discrete local frequencies corresponding to favorable integration steps and included in a band centering on the frequency found during synchronization of the sequences. The invention also relates to the closed-loop controlling of the amplification gain in correlators of the demodulator.

10 Claims, 4 Drawing Sheets

PROCESS FOR SEARCHING FOR SYNCHRONIZATION ON RECEPTION OF A SPREAD SPECTRUM MODULATED SIGNAL

BACKGROUND OF THE INVENTION

1- Field of the Invention

The present invention relates to a process and a device for searching for synchronization and carrier frequency on reception of a spread spectrum digital transmission in a demodulator.

More particularly, the invention relates to a received signal which has undergone a direct modulation by pseudorandom (or PN pseudonoise) sequence in a modulator, modulation sometimes called direct sequence. The signal received in the demodulator is a signal resulting from a phase modulation of a carrier by a data signal and by a digital pseudorandom sequence signal. In this type of transmission, the power of the useful signal is considerably less than the power of the thermal noise or other interference received simultaneously. The demodulator has no prior information on either the spread spectrum sequence phase of the received signal or on the precise value of the carrier frequency of the received signal. The uncertainty concerning the value of the carrier frequency may correspond to $10^{-5}$ to $10^{-6}$ in relative value.

2- State of the Prior Art

Such a transmission process is particularly implemented for Code Division Multiple Access transmissions (CDMA): a certain frequency band centered on the carrier is shared by several communications simultaneously, and each communication occupies the entire band at all times. Such transmissions can be carried out between fixed or mobile stations by satellite, between earth radio stations and relays, for direct short-distance links between small mobile earth stations, as well as for digital links on optic fibers.

In this type of transmission, the main problem upon reception of the spread signal is the initial synchronization of the local pseudorandom sequence derived in the receiver with the pseudorandom sequence in the received signal. Traditionally, the received signal undergoes a change of frequency towards an intermediary frequency, by heterodyning with the local signal issued by an oscillator with a frequency close to the carrier frequency. The local signal is modulated beforehand by a locally generated pseudorandom sequence that is identical to that contained in the received signal but of which the phase with regard to the received sequence is to be searched for.

The synchronization between the received sequence and the local sequence is carried out by a phase drift method described by Jack K. HOLMES in the book entitled "Coherent spread spectrum systems", edited by John Wiley & Sons, New York, 1982, chapter 9, particularly paragraph 9.2.3, pages 411 to 419.

J. K. HOLMES refers to the iteration of double integration (or dwell) steps of the intermediary frequency signal resulting from the correlation between the received signal and the locally modulated signal. The locally produced sequence is applied to the received signal by successively shifting it by half-bit stepping increments (or one-half chips) with regard to the sequence in the received signal. Each shift is followed by an integration of the correlation signal over a first predetermined period after the correlation signal has been filtered and rectified. If the integrated signal exceeds a predetermined threshold, the demodulator performs a second integration during a second predetermined period, usually equal to a whole multiple of the first period, and at the end of this second integration compares the integrated signal with a second voltage threshold usually equal to the first one. If the integrated signal again exceeds the voltage threshold, the synchronization of the sequences is declared acquired.

If the threshold is not exceeded after the first or second integration, the demodulator again shifts the local sequence by a half-bit with regard to the received signal, and recommences the double integration cycle described above. Throughout the sequence synchronization search period, the control voltage of the local oscillator that supplies the clock frequency to the pseudorandom sequence generator is set at a predetermined value, such that the clock frequency is equal to an average operating value.

However, for the two decisions following the successive integrations to be properly interpreted, it goes without saying that the oscillator generating the local frequency must be set to the exact value of the received carrier. On the one hand, the signal is drowned in thermal noise, and the carrier itself is suppressed during the modulation in the modulator. On the other hand, the value of the carrier is uncertain to within a few tens of kilohertz, in practice to within more or less 100 kHz approximately e.g. when the transmission frequencies are greater than a few GHz. This uncertainty can notably result from frequency transpositions. Furthermore, to these uncertainties must be added those influenced by the Doppler effect.

It therefore appears that in the demodulator, the processing of data carried by the received signal presupposes the prior removal of two uncertainties concerning the received signal:

the phase of the spread sequence, and the value of the carrier frequency.

Currently, in spread spectrum demodulators for autonomous receivers, i.e. that do not indirectly receive the pure carrier either by an additional transmission medium or via a frequency-shifted signal, the demodulator searches for the value of the carrier by an alternating and continuous scanning of the uncertainty range of the carrier frequency.

This scanning is obtained by applying a saw tooth or sinusoidal voltage to the local oscillator deriving the local frequency close to the carrier frequency. The scanning period is usually long, typically in the region of one second, to take response and stabilization times of the circuits involved in the synchronization search into consideration, said circuits being notably filter, detector and integrator. Repeated sequence synchronization attempts, e.g. according to the double integration method described above, are superposed on this frequency scanning. As soon as synchronization is acquired, i.e., when an integration has produced a positive result, the shifting of the local sequence is stopped. This known process has the disadvantage of being slow, and in practice requires several tens of seconds to acquire the synchronization of the sequences and the carrier frequency.

OBJECTS OF THE INVENTION

The main object of this invention is to provide a simultaneous search process for the synchronization of the spread sequences and the carrier frequency for independent receiver, much faster than the prior process described above. In particular, the process embodying the invention does not use continuous and slow scanning of the uncertainty range of the carrier frequency, but uses fast scanning by only selecting discrete frequency values.

SUMMARY OF THE INVENTION

Accordingly, a process for searching for synchronization and frequency of a carrier deals with a received signal to be demodulated resulting from a phase modulation of a digital pseudorandom sequence by a data signal, the digital psuedorandom sequence phasmodulating said carrier and having a length of L bits.

A local signal having a local frequency close to the frequency of said carrier is phase-modulated by a local digital pseudorandom sequence identical to the sequence in the received signal and then is mixed with said received signal into a mixed signal with intermediary frequency. The mixed signal is filtered in a filtering frequency band centered on a predetermined intermediary center frequency and having a predetermined width into a filter signal.

The process comprises an integration step which consists in integrating the filtered signal into an integrated signal for at least a predetermined period and in comparing the filtered signal with at least one predetermined threshold for a predetermined value of local frequency and a predetermined shifting of the local sequence with regard to the sequence in the received signal.

This process is characterized according to the invention by plural successive series of integration steps respectively for first predetermined discrete values of the local frequency corresponding to first intermediary frequencies substantially equidistributed in a band widely including the filtering band, each series of steps comprising at least 2L integration steps corresponding to 2L successive half-bit time shifts of the local sequence respectively, and the discrete variation of the local frequency and the half-bit shifting of the local sequence ceasing at a first found intermediary frequency and at a found time shift found as soon as the integrated signal exceeds said predetermined threshold, and last integration steps in a predetermined number for which the local sequence does not undergo any time shift and during which the local frequency is respectively estimated at second respective discrete values which are deducted from one another from a second frequency stepping increment that is lower than the difference between two first intermediary frequencies and which correspond to intermediary frequencies included in a second frequency band centered on said first found frequency and wider than the filtering band, each of the last steps at the end of which said integrated signal exceeds said threshold being declared favourable, and the calculation of a parameter varying linearly with the average frequency of the local frequencies which respectively correspond to the last favourable steps thereby setting the local signal at said average frequency.

The local average frequency is then substantially equal to the frequency of the carrier of the received signal which can vary several tens of kHz.

According to another feature of the invention, the process comprises, after said plural successive series of integration steps and before said last integration steps, a centering of the intermediary frequency by means of discrete variation of said local frequency and with regard to the center frequency of said filtering band, without sequence time shifts, said frequency centering consisting in successively carrying out two integration steps for third and fourth frequencies of which the average is substantially equal to the first found frequency and of which the difference is less than the width of the filtering band, and replacing the first found frequency, as center frequency of the second frequency band, by a second found frequency equal to the average of the frequencies including the first found frequency and said third and fourth frequencies and having produced an integrated signal exceeding said threshold.

A sequence synchronization and carrier frequency searching device implementing the process embodying the invention comprises means for deriving a signal at the predetermined local frequency, means for generating the local digital pseudorandom sequence, and a first correlator. The first correlator comprises first modulation means for phase-modulating the local frequency signal by the local sequence into a modulated signal, second modulation means for phase-modulating the signal received by the modulated signal into the mixed signal, means for filtering the mixed signal in the filtering band into a filtered signal, means for integrating the filtered signal into an integrated signal, and means for comparing the integrated signal with at least the predetermined threshold. The device further comprises control means for modifying the integration period in the integrating means and a local sequence time shift in the generating means as a function of a comparison signal supplied by the comparing means, and means controlled by the control means for modifying said local frequency in the deriving means notably to enable the local frequency to be equal to said first predetermined discrete values and second discrete values of the local frequency.

Such a device can be included in a demodulator called direct sequence demodulator. In addition, it comprises a second correlator receiving said received signal and alternatively receiving, under the control of said control means, two pseudorandom sequences deducted from the local signal by one half-bit advance and delay. The second correlator alternately produces two correlation signals respectively corresponding to the correlation between the received sequence and the advanced sequence and to the correlation between the received sequence and the delayed sequence, after completion of the frequency and synchronization acquisition phase. The first and second correlators comprise respective variable gain amplifiers controlled by the control means. The amplifiers have gains that are as a function of the sum of two correlation signals produced by the second correlator.

BRIEF DESCRIPTION OF THE DRAWINGS

Further features and advantages of the invention will be apparent from the following particular description of several preferred embodiments of this invention as illustrated in the corresponding accompanying drawings in which.

DESCRIPTION OF THE PREFERRED EMBODIMENTS

To establish matters, the description hereinunder of a sequence synchronization and carrier frequency searching device 1 is accompanied by several numerical values provided as preferred examples. The device can be included in a phase demodulator of a modem which is described in greater detail hereinafter.

On the input side, the device 1 receives a radiofrequency signal RF having a carrier frequency $FP \simeq 70$ MHz determined to within some one hundred kHz. In practice, the signal RF is transmitted e.g. via a radio-electric channel transposed at a few gigahertz, by a transmitter modulator. In the modulator, a data digital signal with low rate, $DD = 16$ kbit/s, phase-modulates a pseudorandom digital sequence stream into a modulated digital signal which itself phase-modulates a high-frequency carrier of $FP \simeq 70$ MHz to $DI/2 = \pm 70$ kHz approximately. The sequence bits have a very high rate $DS = 4$ Mbits/s $> > DD$. The sequence has a predetermined length $L = 127$ bits and is independent of the data. We suppose the phase modulations to be two or four-state modulations, typically of the two-state type MDP2. In practice, the data signal and the sequence stream are modulo-2 added into a modulated digital signal which MDP2 or MDP4 modulates the carrier into said radiofrequency signal RF. Such a signal is a signal of direct modulation by pseudorandom sequence, a modulation which comes under one of the two categories of spread spectrum modulation.

Figure 1:
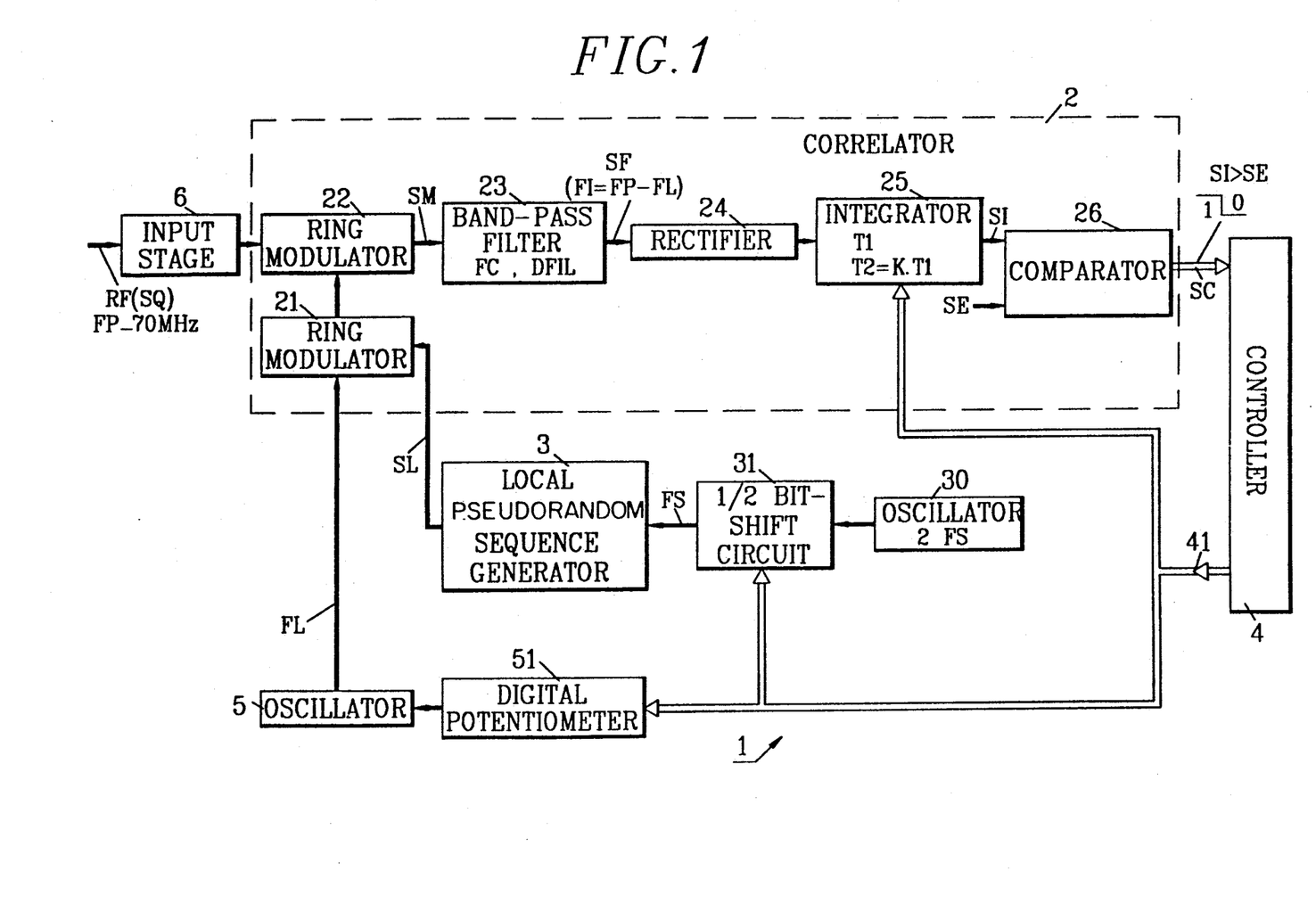
FIG. 1 is a schematic block diagram of a sequence synchronization and carrier searching device embodying the invention.

In reference to FIG. 1, the sequence synchronization and carrier frequency searching device 1 mainly comprises a sequence correlator 2, a local pseudorandom (pseudonoise) sequence generator 3 associated with an oscillator 30, a microprocessor-fitted controller 4, and a local frequency oscillator 5.

A first input of the correlator 2 receives the radiofrequency signal RF via an input stage 6 which amplifies and band-pass filters the signal RF. The first oscillator 5 has a local frequency FL close to the carrier frequency FP and is voltage-controlled by the controller 4 via a digital potentiometer 51. The nominal frequency of the local frequency FL is 69.545 MHz. The second oscillator 30 applies a clock signal with a frequency $2FS = 8$ MHz to a half-bit shift circuit 31. The circuit 31 supplies a clock signal with the frequency FS to the sequence generator 3. In this instance, the frequency FS is presumed constant and equal to the rate of the received pseudorandom sequence SQ, i.e., $FS = 4$ MHz. The shifting in the circuit 31 is controlled by the controller 4 and evaluated with regard to the received sequences. The output of the generator 3 periodically transmits a local pseudorandom signal SL which is applied to a first input of a ring modulator 21 included in the correlator 2. A second input of the modulator 21 receives the signal at the local carrier frequency FL produced by the first oscillator 5, in order for this signal to be phase-modulated by the local sequence SL.

The correlator 2 also comprises a second ring modulator 22 of which one input receives the radiofrequency signal RF transmitted by the distant transmitter modulator via the input stage 6 and of which a second input is connected to the output of the first modulator 21. The ring modulator 22 derives at output a mixed signal SM having an intermediary frequency $FI = FP - FL = 455$ kHz resulting from the frequency transposition of the carrier FP by the frequency FL of the oscillator 5. When the synchronization is acquired with regard to both the phase of the sequences and the carrier frequency, i.e., in permanent operating of the demodulator, the signal SM no longer contains but the useful information with rate DD modulating the carrier. The pseuodorandom sequences have disappeared in the mixed signal SM due to the fact that the ring modulator 22 remodulates the signal RF a second time by phase jumps of $\pi$ controlled by the local sequence when the sequences are synchronous. The correlator 2 is thus equivalent to a heterodyne detector enabling the correlation between modulated local signal and received signal RF to be processed at an intermediary frequency.

At the output of the ring modulator 22 are series-connected in the correlator 2 a band-pass filter 23, a full-wave rectifier 24, an integrator 25 controlled by the controller 4, and a voltage comparator 26 of which the logic output is connected to the controller 4.

The band-pass filter 23 is used to take a frequency band corresponding to the useful data signal and therefore to reduce most of the interference received. The band-pass filter 23 is an active filter of which the pass-band has a width $DFIL = 60$ kHz and is centered around a predetermined frequency FC. The frequency FC being virtually constant and equal to 455 kHz, it therefore appears that the local frequency FL of the first oscillator 5 must be adjusted as a function of the unknown carrier frequency FP of the received signal RF in such a way that the intermediary frequency $FI = FP - FL$ be virtually centered in the band DFIL with an uncertainty range of $DI = 140$ kHz. In this case, if the sequence produced by the generator 3 is synchronized with the received sequence SQ in the signal RF, the filtered signal SF with intermediary frequency FI outgoing from the filter 23 can be suitably phase-demodulated to eliminate the carrier and to find the DD-rate data signal.

The purpose of the rectifier 24 and the integrator 25 is to derive an integrated signal SI resulting from an envelope of the filtered signal SF leaving the rectifier 24, and from an integration of the envelope during an integration period determined by the controller 4 via a bus 41. The amplitude of the integrated signal SI quantifies the correlation between the sequences SL produced by the generator 3 and the received sequences included in the signal RF. Indeed, the amplitude increase of the signal SI is the first manifestation of the synchronization of the spread sequences produced by the generator 3 with those included in the received signal RF. In the voltage comparator 26, the amplitude of the integrated signal SI leaving the integrator 25 is compared with a predetermined voltage threshold SE. When SI>SE, a logic comparison signal SC outgoing from the comparator 26 jumps from the state typically "1" to the state "0", and indicates that synchronization of the sequences has been acquired, at least with regard to the integration period in the integrator 25, and without taking into account other criteria discussed hereinunder.

The controller 4 controls the integrator 25 by actuating a switch in the latter so as to modify the integration period, controls the shift circuit 31 so as to briefly stop the deriving of the clock signal at FS=4 MHz in the generator 3, thereby "shifting" the local sequence SL by a half-bit with regard to the received sequence SQ, and finally controls the digital potentiometer 51 by supplying a digital position value of the potentiometer slide corresponding to an analog control voltage of the oscillator 5. The different orders from the controller are transmitted via the bus 41.

Before describing the process for searching for the phase of the received pseudorandom sequence and for the value of the carrier frequency, we will firstly recall the procedure of a sequence integration step for a predetermined value of the local frequency FL and a predetermined shift of the sequence of the local signal SL with regard to the sequence of the received signal.

Subsequent to a predetermined time shift, typically of one half-bit, the controller 4 time-fills a 42-μs wait to enable the signal SF leaving the band-pass filter 23 to be stabilized. During this lapse of time, an internal capacitance in the integrator 25 is shunted by a CMOS switch controlled by the controller. Then the controller 4 opens the CMOS switch for a first predetermined period T1, as close as possible to the period of the sequence, i.e. T1≈32 μs for a sequence length of 127 bits. The integrator 25 therefore integrates the filtered and rectified signal, and at the end of this first period T1, the controller 4 reads the state of the logic signal SC at the output of the comparator 26.

If SE>SI, i.e. if the signal SC is in the unfavourable state "1", the controller 4 resets the integrator 25 and moves on to the following step which may consist in a further half-bit time shift of the local sequence.

If the logic signal SC from the output of the comparator 26 is in the favourable state "0", the controller 4 performs a second integration during a period T2 equal to an integer K times the first period T1, i.e., T2=K.T1 where K is typically equal to 10 and corresponds to T2=320 μs. A new comparison of the integrated signal SI with a second threshold greater than the first threshold SE, or equal to SE according to this embodiment, and therefore a new reading of the output of the comparator 26 enables the controller 4 to finally decide whether the tested sequence phase is substantially equal to that of the sequence in the received signal RF to within one half-bit.

When SC="0" after the period T1 and SC="1" after the period T2=K.T1, the output of the comparator 26 is in the unfavourable state "1", subsequent to the second integration of period T2. This result can be interpreted as a "false alarm" caused by a noise peak or by an intercorrelation in the received signal. The tested sequence phase is rejected, and the controller 4 moves on to the following step.

Conversely, when the output of the comparator 26 is again in the state SC="0" subsequent to a second integration, the synchronization of the sequences is declared acquired. As will be seen further on, a rough frequency scanning is stopped and the phase of the local sequence is maintained, and the controller moves on to steps defining the carrier value more precisely.

The double integration step described above is an elementary step that recurs many times throughout the search for sequence synchronization and for the carrier value of which the program is prestored in the controller 4. This program is essentially comprised of three main steps relating to a search for synchronization of local and received sequences and to a rough evaluation of the received carrier, then to an approximative centering of the local frequency FL in the filtering band DFIL, and finally to a fine search for the value of the received carrier. Preferably, the second intermediary step is included in the program of the controller 4, though it may be suppressed in a simpler embodiment of the process embodying the invention.

As soon as the device 1 is powered up, the first step is undertaken by the controller 4. The local frequency FL of the oscillator 5 is set at the lower frequency limit, which is theoretically 69545−(140/2)=69475 kHz, of the uncertainty range of the carrier frequency, having a width DI supposed in this instance equal to 140 kHz and which corresponds to the intermediary frequency F1=455−70=385 kHz. The graphs of FIGS. 2 to 4 pertain to the intermediary frequency FI, though the local frequency FL can be deducted by translation.

Figure 2:
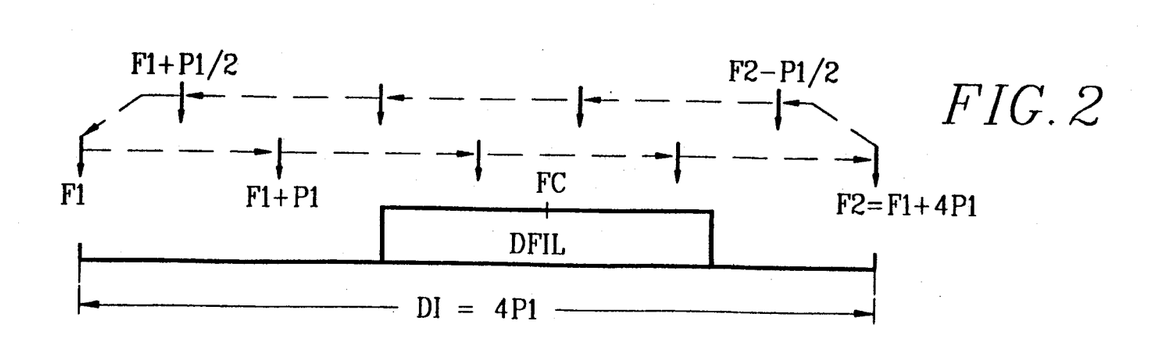
FIG. 2 is a frequency diagram illustrating a first principal step of the process embodying the invention, relating to a search for synchronization of the received and local sequences and to a rough evaluation of the frequency of the received carrier.

The first step consists in a scanning by discrete frequency values in the range DI. These discrete values are grouped into successive arithmetic series in which a discrete frequency value is deducted from the previous one by addition or subtraction of a first frequency stepping increment P1<DFIL, typically equal to DI/N1, where N1 is an integer typically equal to 4, i.e., P1=35 kHz as shown in FIG. 2. The successive series are interlaced two-by-two and are alternately increasing and decreasing series. The first series thus comprises the successive frequencies F1, F1+P1, F1+2(P1), F1+3(P1) and F1+4(P1)=F1+DI, where F2=F1+DI is the upper frequency limit of the uncertainty range DI. Then the second series comprises the successive frequencies F2−P1/2, F2−3.P1/2, F2−5.P1/2 and F2−7.P1/2.

The scanning then recommences at F1 as per the first series described above.

At each discrete value of the local frequency FL thus selected by discrete variation of the resistance of the potentiometer 51, the controller 4 carries out at most 2L integration steps which correspond to 2L successive half-bit time shifts in the local sequence SL. As long as the first or second integration is unfavourable, the end of each integration step is followed by the following step corresponding to a further half-bit shift in the circuit 31. When the 2L successive shifts have been unfavourable, with SC="1", the controller 4 moves on to the following frequency stepping increment as per the sequences defined above.

As soon as the state of the comparison signal SC changes to the favourable state "0" after a second integration of period T2, the sequence half-bit time shifts cease and the controller 4 declares the synchronization of the spread spectrum pseudorandom sequences to have been acquired. The controller 4 stores the current value found for the frequency FL, i.e., the corresponding intermediary frequency FT1, and more precisely in practice, the position of the potentiometer slide 51. The controller 4 then moves to the second step of the program, and the time shift found, i.e., the phase of the local sequence SL, is maintained.

Figures 3, 4:
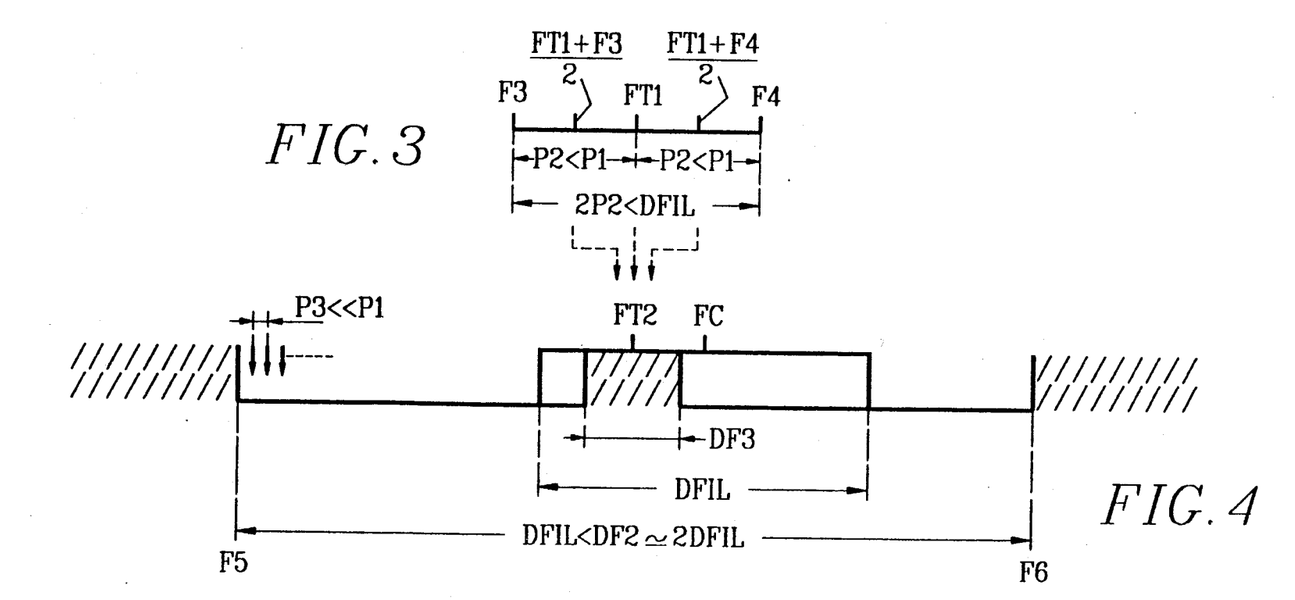
FIG. 3 is a frequency diagram illustrating a second principal step of the process embodying the invention, relating to an approximate centering of the local frequency with regard to the filtering band of a band-pass filter of the demodulator.
FIG. 4 is a frequency diagram for illustrating a third principal step of the process embodying the invention, relating to a fine search of the value of the received carrier frequency.

This second step consists in approximately "recentering" the frequency found FT1 in the filtering band DFIL=60 kHz. To do this, the controller 4 successively positions the digital potentiometer 51 at two local frequencies FL of the oscillator 5 corresponding to intermediary frequencies F3 and F4, such that F3=FT1−P2 and F4=FT1+P2 with P2<P1 and 2P2<DFIL, i.e., for instance P2≃DFIL/3≃2.P1/3≃22 kHz, as shown in FIG. 3. An elementary integration step is carried out for each of the frequencies F3 and F4. If just one of the elementary steps with the respective frequencies F3 and F4 has produced a favourable double integration, i.e., SI>SE and SC="0" after the period T2, then the controller 4 sets the oscillator 5 at a local frequency corresponding to average of FT1 and the maintained frequency F3 or F4, i.e., FT2=FT1±P2/2, that is FT2=(FT1+F3)/2 or FT2=(FT1+F4)/2; the second frequency found FT2 is then closer than the frequency FT1 to the center frequency FC of the filtering band DFIL. If the two elementary steps produce a favourable double integration, the local frequency preceding the end of the first step remains unchanged, i.e., FT2=FT1; the frequency FT1 is therefore close to the center frequency FC.

The third and final step consists in fining down the searched value of the received carrier frequency with regard to the value FT2. The fining down results from a discrete scanning with small stepping increments P3<<P1 of a frequency range centered around the value FT2 and having a width DF2 greater than DFIL. The band DF2 is not too broad insofar as we know a priori that FT2 is substantially in the center part of the band DFIL and that beyond a certain width the result of the sequence synchronization verification is surely bad since the noise becomes dominant in the received signal RF. Typically, according to FIG. 4, the width DF2 is equal to 2.DFIL=120 kHz.

Preferably, a short frequency range DF3 centered around the frequency FT2 is excluded from the discrete scanning with small stepping increments P3 in order to minimize errors; this is the same as supposing that all synchronization verifications within the band DF3 certainly produce a favourable result, SC="0" after the period T2, and that it is therefore not worthwhile carrying out this verification in order to shorten the third step.

Typically, DF3 is shorter than DFIL/2, e.g. equal to P2=22 kHz, and P3 is equal to 1.7 kHz approximately, which corresponds to N2=(DF2−DF3)/P3=58 elementary integration steps carried out successively, e.g. from F5=FT2−DF2/2 to FT2−DF3/2, and then from FT2+DF3/2 to F6=FT2+DF2/2.

At the beginning of the third step, the controller 4 resets two internal registers, such as counters. At each favourable elementary integration step, a first of these registers is incremented by the rank of the stepping increment P3, supposing e.g. that the rank of the step at frequency F5 is equal to 1 and that the rank of the step corresponding to the frequency F6=FT2+DF2/2 is equal to N2+N3, where N3=DF3/P3 is the number of stepping increments P3 in the forbidden band DF3. Simultaneously, the second register is incremented by one unit in response to each favourable elementary integration step.

At the end of the third step, after completion of the N3 elementary steps, the value of the received carrier frequency FP is estimated at a local frequency value FLE which corresponds to an intermediary frequency FIE that is very close to the center frequency FC and selected by the following average rank RM, calculated by the controller 4:

$$RM = \Sigma/\sigma$$

where $\Sigma$ = the sum of the ranks of the favourable steps, $\sigma$ = the number of favourable steps, i.e., FIE=F5+(P3.$\Sigma$)/$\sigma$.

The controller 4 then adjusts the potentiometer 51 to the local frequency value FLE.

The advantages of the process embodying the invention are numerous. The following may be quoted.

The synchronization search technique embodying the invention solves the problem of the response and stabilization times of the circuits 22 to 26 involved in the search. Subsequent to each discrete variation of the frequency FL of the oscillator 5, the controller 4 need only wait a few microseconds for the outputs of these circuits to settle before launching a sequence synchronization search.

Furthermore, the process embodying the invention accelerates the search in that is merely explores the carrier frequency uncertainty range DI at a few points Fl, F1+P1, ... spaced apart by the shift stepping increment. It is useless to explore the entire uncertainty range DI. It is sufficient to carry out judiciously spread out tests in such a way that, usually, just three or four adjacent frequency values such as F1+2.P1, F1+3.P1, F2−3.P1/2, F2−5.P1/2 are likely to be included in the band DFIL of the filter 23.

The two initial uncertainties are therefore removed simultaneously and complementarily: it is the approach of the value of the received carrier frequency that enables the spread sequences to be synchronized and it is the sequence synchronization condition that enables the adjusting in the circuits of the device 1 to be fined down with regard to this carrier frequency.

An essential component taking part in the synchronization search is the digital potentiometer 51 which enables discrete and calibrated frequency variations to be applied to the oscillator 5; moreover, these variations are perfectly controllable by the controller 4 since a number, called rank, in the registers of the controller corresponds to each frequency stepping increment.

It should also be noted that the reliability of the process embodying the invention does not at all depend on the digital values mentioned for the frequencies of the oscillators, the width of the band DFIL of the filter 23, the frequency exploration stepping increments p1 to p3, the different frequency ranges defined above DI, DF2 and DF3, or the number of positions of the slide of the digital potentiometer 51. Said digital values are characteristic features of the modem for which the process was perfected according to a preferred embodiment.

Figure 5:
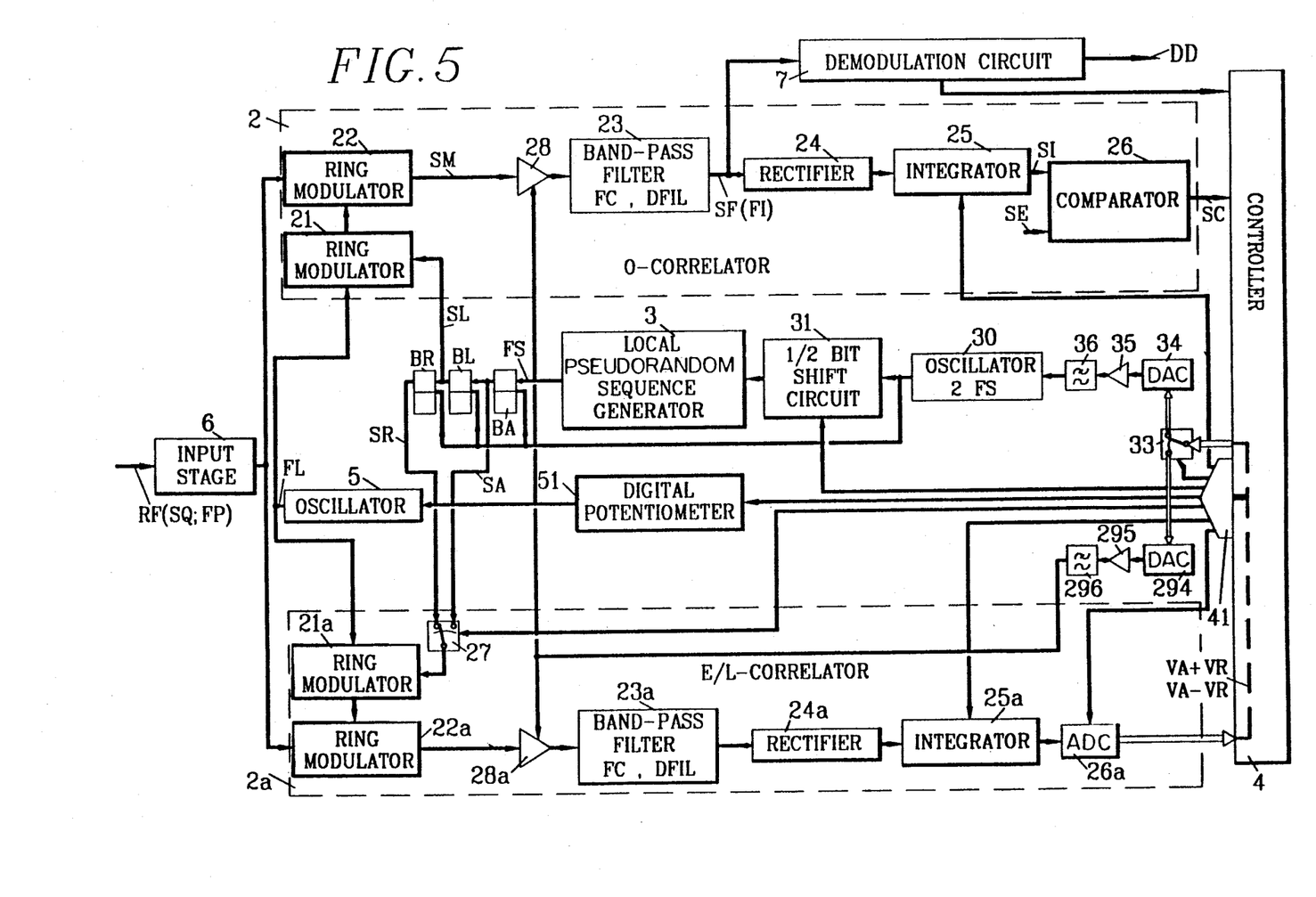
FIG. 5 is a schematic block diagram of a spread spectrum demodulator comprising two correlators, embodying the invention.

In reference now to FIG. 5, the same circuits are shown as in FIG. 1, but included in a modem demodulator. This demodulator comprises at input two parallel channels materialized by the sequence correlator 2 already described and another Early/Late correlator 2a.

The first correlator 2 is called "correlator 0" to indicate that the local sequence in this correlator does not undergo any delay when the received sequence SQ and local sequence SL are in phase. On the other hand, in the second correlator 2a, two local sequences SA and SR correlated with the received sequence SQ have been advanced or delayed by one half-bit with regard to the local sequence in phase SL in the correlator 2, and therefore with regard to the received sequence SQ when the latter is in phase with the sequence SL. The three local sequences SL, SA and SR which are respectively in phase, advanced and delayed by one half-bit with regard to the sequence SQ in the received signal RF upon synchronization, are supplied by the outputs of three D flips-flops BA, BL and BR, connected in series to the output of the pseudorandom sequence generator 3 and clocked by the signal of frequency 2FS leaving the oscillator 30.

The second correlator comprises a switch 27 controlled by the controller 4, via the bus 41, for selecting one of the outputs of the flips-flops BA and BR producing the sequences SA and SR. The output of the flip-flop BL producing the sequence SL is connected to a first input of the ring modulator 21 in the correlator 2.

Like the correlator 2, the correlator 2a comprises a first ring modulator 21a having a second input connected to the output of the local frequency oscillator 5, a second ring modulator 22a having inputs respectively connected to the outputs of the input stage 6 and of the modulator 21a, as well as a band-pass filter 23a identical to the filter 23, a full-wave rectifier 24a, an integrator 25a and an analog-to-digital converter 26a which are connected in series to the output of the modulator 22a. The controller 4 controls the integration period in the integrator 25a and the sample reading in the converter 26a via wires of the bus 41.

The second correlator 2a is used to maintain the synchronization after it has been acquired, in this instance according to the process of the invention described in detail above. The synchronization is maintained by a control loop between the correlator 2a and mainly orders that are applied to the local frequency oscillator 5 via the potentiometer 51, and to the other oscillator 30 with frequency 2FS. In practice, the oscillator 30 is an oscillator that is voltage-controlled via a switching circuit 33, a digital-to-analog converter 34, a follower-amplifier 35 and a low-pass filter 36. The converter 34 and the filter 36 are put out of operation by the controller 4 during the search for sequence synchronization and carrier frequency; to do so, mobile contacts of the switching circuit 33 are applied against first output contacts of the switching circuit connected to the digital inputs of the converter 34 under the control of the controller 4. Other control signals may also occur in the closed loop-control of the synchronization, e.g. a signal issued by a filter included in a phase-shifting circuit of the demodulation circuit 7 proper which is connected to the output of the filter 23 and which traditionally transmits the suitably reshaped DD-rate data signal.

Figure 6A:
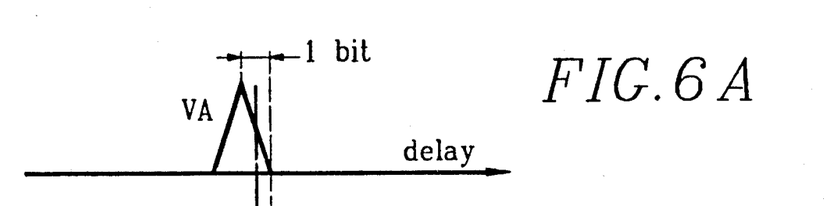
FIGS. 6A and 6B are timing diagrams respectively showing amplitude variations of two signals integrated in a second early/late correlator included in the demodulator in FIG. 5.
Figure 6B:
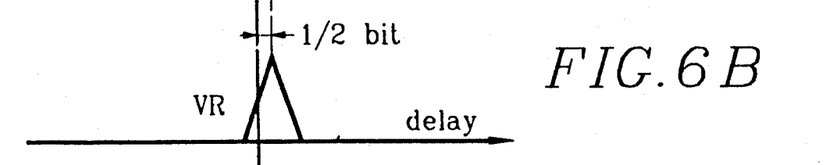
Figure 7:
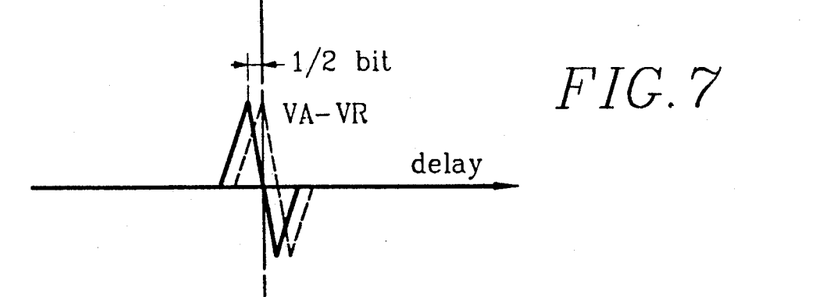
FIG. 7 is a timing diagram of the difference between the two signals shown in FIGS. 6A and 6B.

Briefly, the closed-loop control process of the synchronization is as follows. The controller 4 alternately controls the switch 27 of which the output is connected to the first input of the modulator 21a for the received sequence SQ in the intermediary frequency signal FI to be correlated with the sequences SA and SR. After two integrations of approximately 2 ms each in the integrator 25a, two digital "early and late" voltage signals VA and VR leaving the converter 26a are subtracted in the controller 4. As shown in FIGS. 6A and 6B, the amplitudes of the signals VA and VR are variable as a function of the advance of the sequence SA and of the delay of the sequence SR with regard to the received sequence SQ and are respectively maximal when the sequences SA and SR are synchronous with the sequence SQ. As a function of the difference VA−VR calculated by the controller 4, as shown in FIG. 7, correction signals are derived particularly for the oscillator 30 in order to offset drifts from the exact synchronization.

The two correlators 2 and 2a traditionally comprise amplifiers that are not represented, as well as variable gain amplifiers 28 and 28a of which the gain is controlled by the controller 4. The purpose of the amplifiers 28 and 28a is to maintain an optimum signal level not only at the input of the demodulation circuit 7, but also at output of the integrators 25 and 25a. In particular, the signal SI at output of the integrator 25 must only exceed the threshold SE at the time of synchronization. The optimum signal level is therefore a function of the synchronization of the sequences in the demodulator.

According to the prior art, automatic gain-control (AGC) signals of the amplifiers 28 and 28a are derived as a function of the signal at output of the integrator 25. This requires using a power detector, such as the rectifier 24 supplying the envelope of the filtered signal.

The drawback of the prior art is that the gain depends, not insignificantly on synchronization to within much less than one half-bit and consequently on the closed-loop control of the synchronization. As shown in FIG. 6A or 6B, e.g. when the local sequence SL is substantially out of sync with the received sequence SQ, early or late by one half-bit, the received power information is wildly erroneous, indicating zero power, thereby prohibitively increasing the gain of the reception amplifiers 28 and 28a.

Figure 8:
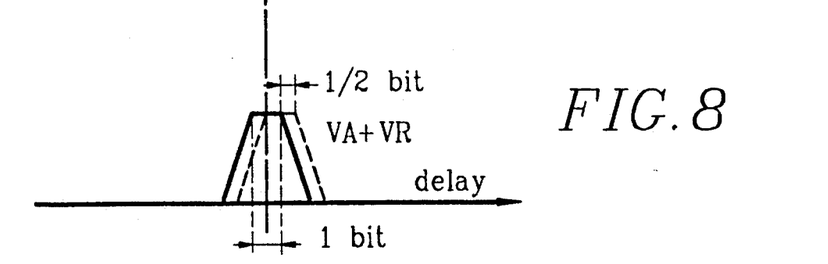
FIG. 8 is a timing diagram of the sum of the two signals shown in FIGS. 6A and 6B.

According to the invention, the controller 4 also calculates the sum of the voltage signals VA+VR, as shown in FIG. 8, to control the gain of the amplifiers 28 and 28a as a function of this sum.

According to the embodiment illustrated in FIG. 5, the gain of the amplifiers 28 and 28a is controlled by the controller 4 during the maintaining of the synchronization, when mobile contacts of the switching circuit 33 are applied against second contacts at output of the circuit 33. The second contacts are connected to gain-control inputs of the amplifiers 28 and 28a, via another series combination comprising a digital-to-analog converter 294, a follower-amplifier 295 and a low-pass filter 296. The converter 34 or the filter 36 maintains a control voltage in the oscillator 30 during the synchronization maintaining, though according to other embodiments this control voltage can be modified at will by the controller 4 by suppressing the switching circuit 33 and by direct connections from the converters 34 and 294 to the controller.

As shown in broken lines in FIG. 8, a variation of one half-bit more, or less, of the phase of the sequence SL with regard to the received sequence SQ in the signal RF does not influence the amplitude of the signal VA+VR. In practice, the difference between the signal of the sum VA+VR and a predetermined threshold in the controller 4 directly determines the gain in the amplifiers 28 and 28a. This gain is therefore substantially constant during the closed-loop control phase of the synchronization and the normal use phase of the demodulator, as long as the shift corrections do not exceed more or less one half-bit of sequence.

Furthermore, the comparison threshold SE in the comparator 26 is then chosen as a function of the noise in the link between the modulator and the demodulator, measurable by means of the correlator 2a, during the acquisition phase, at the moments when there is no synchronization between the modulator and the demodulator.

What we claim is:

1. A process for searching for synchronization and frequency of a carrier in order to demodulate a received signal resulting from a phase modulation of a digital pseudorandom sequence by a data signal, said digital pseudorandom sequence phase-modulating said carrier and having a length of L bits, process according to which a local signal having a local frequency close to said frequency of said carrier is phase-modulated by a local digital pseudorandom sequence identical to said sequence in said received signal and then is mixed with said received signal into a mixed signal with intermediary frequency, and said mixed signal is filtered in a filtering frequency band centered on a predetermined intermediary center frequency and having a predetermined width into a filtered signal, and process comprising an integration step which consists in integrating said filtered signal into an integrated signal for at least a predetermined period and in comparing said filtered signal with at least one predetermined threshold, for a predetermined value of said local frequency and a predetermined shifting of said local sequence with regard to said sequence in said received signal, said process being characterized by plural successive series of integration steps respectively for first predetermined discrete values of said local frequency corresponding to first intermediary frequencies substantially equidistributed in a band widely including said filtering band, each series of steps comprising at least 2L integration steps corresponding to 2L successive half-bit time shifts of said local sequence respectively, and the discrete variation of said local frequency and the half-bit shifting of said local sequence ceasing at a first found intermediary frequency and at a found time shift as soon as said integrated signal exceeds said predetermined threshold, and last integration steps in a predetermined number for which said local sequence does not undergo any time shift and during which said local frequency is respectively estimated at second respective discrete values which are deducted from one another from a second frequency stepping increment that is lower than the difference between two first intermediary frequencies and which correspond to intermediary frequencies included in a second frequency band centered on said first found frequency and wider than said filtering band, each of said last steps at the end of which said integrated signal exceeds said threshold being declared favourable, and the calculation of a parameter varying linearly with the average frequency of said local frequencies which respectively correspond to the last favourable steps thereby setting said local signal at said average frequency.

2. The process claimed in claim 1, wherein said first intermediary frequencies constitute two arithmetic series each having a same first stepping increment and interlaced two-by-two with a shift of a half of a first stepping increment.

3. The process claimed in claim 2, wherein said first intermediary frequencies are included in a frequency band substantially equal to twice said filtering band.

4. The process as claimed in claim 1 comprising, after said plural successive series of integration steps and before said last integration steps, a centering of said intermediary frequency by means of a discrete variation of said local frequency and with regard to said center frequency of said filtering band, without sequence time shifts, said frequency centering consisting in successively carrying out two integration steps for third and fourth frequencies of which the average is substantially equal to said first found frequency and of which the difference is less than the width of said filtering band, and replacing said first found frequency, as center frequency of said second frequency hand, by a second found frequency equal to the average of the frequencies including said first found frequency and said third and fourth frequencies and having produced an integrated signal (SI) exceeding said threshold.

5. The process claimed in claim 4, wherein the difference between said first found frequency and said third and fourth frequencies is smaller than the difference between two first successive intermediary frequencies.

6. The process claimed in claim 1, wherein said second frequency band does not comprise a short frequency band centered on said first found frequency, said short frequency band having a width less than half said width of said filtering band.

7. The process claimed in claim 1, wherein said width of said second frequency band is greater than said width of said filtering band and is substantially equal to twice said width of said filtering band.

8. A sequence synchronization and carrier frequency searching device included in a phase demodulator which demodulates a received signal resulting from a phase modulation of a digital pseudorandom sequence by a data signal, said digital pseudorandom sequence phase-modulating said carrier and having a predetermined length L of bits, said device comprising means for deriving a signal at a predetermined local frequency close of the frequency of said carrier, means for generating a local digital pseudorandom sequence identical to said sequence in said received signal, and a first correlator, said first correlator comprising first modulation means for phase-modulating said local frequency signal by said local sequence into a modulated signal, second modulation means for phase-modulating said received signal by said modulated signal into a mixed signal with intermediary frequency, means for filtering said mixed signal in a filtering band into a filtered signal, means for integrating said filtered signal for at least a predetermined integration period into an integrated signal, and means for comparing said integrated signal with at least one predetermined threshold thereby supplying a comparison signal, said device further comprising control means for modifying said integration period in said integrating means and a local sequence time shift in said generating means as a function of said comparison signal, and means controlled by said control means for modifying said local frequency in said deriving means to enable said local frequency to be equal to first discrete values and second discrete values, said first discrete values of said local frequency corresponding to first intermediary frequencies in said mixed signal substantially equidistributed in a band widely including said filtering band, said first local frequency discrete values being deriving in said deriving means under the control under said control means during plural successive series of integration steps respectively, each series of steps including at least 2L integration steps in said integrating means corresponding to 2L successive half-bit time shifts of said local sequence in said sequence generating means respectively, said control means stopping the discrete variation of said local frequency and the half-bit shifting of said local sequence responsive to said integrated signal exceeding said predetermined threshold, and said second discrete values of said local frequency being deducted from one another from a second frequency stepping increment that is lower than the difference between two first intermediary frequencies and which correspond to intermediary frequencies included in a second frequency band centered on said first found frequency and wider than said filtering band, said second local frequency discrete values being deriving by said deriving means under the control of said control means during last integration steps for which said local sequence does not undergo any time shift.

9. The device claimed in claim 8, wherein said modifying means comprises a digital potentiometer controlled by said control means.

10. The device claimed in claim 8, further comprising means connected to said local sequence generating means for deducting pseudorandom sequences advanced and delayed of one half-bit with regard to said local sequence, a second correlator for correlated said received signal and alternately, under the control of said control means, said advanced and delayed pseudorandom sequences into two correlation signals respectively corresponding to the correlation between said received sequence and said advanced sequence and to the correlation between said received sequence and said delayed sequence, said correlators comprising respective variable gain amplifiers controlled by said controlling means, said amplifiers having gains that are as a function of the sum of said two correlation signals from said second correlator.

* * * * *